US012619032B2

(12) United States Patent
Uehara et al.

(10) Patent No.: US 12,619,032 B2
(45) Date of Patent: May 5, 2026

(54) ADAPTER AND OPTICAL CONNECTION STRUCTURE

(71) Applicants: SUMITOMO ELECTRIC INDUSTRIES, LTD., Osaka (JP); NIPPON TSUSHIN DENZAI CO., LTD., Komaki (JP)

(72) Inventors: Fumiya Uehara, Osaka (JP); Sho Yakabe, Osaka (JP); Takako Sashida, Osaka (JP); Yuto Fujihara, Osaka (JP); Dai Sasaki, Osaka (JP); Motoyoshi Kimura, Komaki (JP); Manabu Izaki, Komaki (JP)

(73) Assignees: SUMITOMO ELECTRIC INDUSTRIES, LTD., Osaka (JP); NIPPON TSUSHIN DENZAI CO., LTD., Komaki (JP)

( * ) Notice: Subject to any disclaimer, the term of this patent is extended or adjusted under 35 U.S.C. 154(b) by 279 days.

(21) Appl. No.: 18/029,492

(22) PCT Filed: Sep. 21, 2021

(86) PCT No.: PCT/JP2021/034659
§ 371 (c)(1),
(2) Date: Mar. 30, 2023

(87) PCT Pub. No.: WO2022/085352
PCT Pub. Date: Apr. 28, 2022

(65) Prior Publication Data
US 2023/0367081 A1     Nov. 16, 2023

(30) Foreign Application Priority Data
Oct. 21, 2020     (JP) ................................. 2020-176542

(51) Int. Cl.
*G02B 6/38* (2006.01)

(52) U.S. Cl.
CPC ......... *G02B 6/3825* (2013.01); *G02B 6/3821* (2013.01); *G02B 6/3873* (2013.01); *G02B 6/3889* (2013.01)

(58) Field of Classification Search
CPC ...... G02B 6/38; G02B 6/3825; G02B 6/3821; G02B 6/3873; G02B 6/3889
See application file for complete search history.

(56) References Cited

U.S. PATENT DOCUMENTS 5,737,463 A * 4/1998 Weiss ................... G02B 6/3839
385/59
6,168,317 B1 * 1/2001 Shahid ................. G02B 6/3885
385/59

(Continued)

FOREIGN PATENT DOCUMENTS

JP S61-61111 A 3/1986
JP 2000-131565 A 5/2000

(Continued)

*Primary Examiner* — Tina Wong
(74) *Attorney, Agent, or Firm* — OLIFF PLC

(57) ABSTRACT

An adapter includes a tubular body having a tubular shape and surrounding a pair of ferrules over half a circumference or more with a ling along a first direction as an axis. The tubular body includes a guide extending in the first direction and engaging with side surfaces of the ferrule, and a slit formed from one end to the other end in the first direction.

11 Claims, 13 Drawing Sheets

(56)  References Cited

U.S. PATENT DOCUMENTS

| 6,276,840 | B1 * | 8/2001 | Weiss | .................. | G02B 6/3874 |
| | | | | | 385/59 |
| 6,386,767 | B1 * | 5/2002 | Naghski | .............. | G02B 6/3878 |
| | | | | | 385/59 |
| 7,311,449 | B2 * | 12/2007 | Barnoski | .............. | G02B 6/3885 |
| | | | | | 385/78 |
| 9,933,582 | B1 | 4/2018 | Lin | | |
| 10,359,575 | B1 * | 7/2019 | Li | ........................ | G02B 6/389 |
| 2015/0331201 | A1 * | 11/2015 | Takano | ................ | G02B 6/3875 |
| | | | | | 385/71 |
| 2017/0363816 | A1 * | 12/2017 | Elenbaas | .............. | G02B 6/3882 |
| 2019/0377139 | A1 | 12/2019 | Chang et al. | | |
| 2020/0096707 | A1 * | 3/2020 | Gniadek | .............. | G02B 6/3897 |
| 2020/0371298 | A1 | 11/2020 | Nakama et al. | | |

FOREIGN PATENT DOCUMENTS

| JP | 2003-014983 | A | 1/2003 |
| JP | 2005-181737 | A | 7/2005 |
| JP | 2015-513127 | A | 4/2015 |
| JP | 2015-203858 | A | 11/2015 |
| JP | 2018-092125 | A | 6/2018 |
| JP | 2019-090974 | A | 6/2019 |
| JP | 2019-113713 | A | 7/2019 |
| WO | 2014011283 | A2 | 1/2014 |

* cited by examiner

653

623

623

653

D3

D1    D2

ADAPTER AND OPTICAL CONNECTION STRUCTURE

TECHNICAL FIELD

The present disclosure relates to an adapter and an optical connection structure.

BACKGROUND ART

Patent Literature 1 discloses a technique for aligning multi-core optical fibers using guide pins. In this technique, one ends of a pair of guide pins are each inserted into a pair of guide pin insertion holes provided in a ferrule, and the other ends of the pair of guide pins are each inserted into a pair of guide pin insertion holes provided in a mating connection ferrule.

CITATION LIST

Patent Literature

Patent Literature 1: Japanese Unexamined Patent Publication No. 2019-90974

SUMMARY OF INVENTION

Technical Problem

However, in the above-described technique, the guide pin with high dimensional accuracy is used to reduce the clearance for the guide pin insertion hole as much as possible. For this reason, when the guide pin is inserted and removed a plurality of times, the guide pin insertion hole is damaged, and the accuracy of positioning decreases, which is a problem.

An object of the present disclosure is to provide an adapter and an optical connection structure capable of positioning a plurality of optical fibers with a simple configuration.

Solution to Problem

An adapter according to one embodiment of the present disclosure holds a pair of ferrules facing each other. The adapter includes a tubular body having a tubular shape and surrounding the pair of ferrules over half a circumference or more with a line along a first direction as an axis. The tubular body includes a guide extending in the first direction and engaging with side surfaces of the ferrule, and a slit formed from one end to the other end in the first direction.

Advantageous Effects of Invention

According to the adapter and the optical connection structure of the present disclosure, it is possible to position a plurality of optical fibers with a simple configuration.

BRIEF DESCRIPTION OF DRAWINGS

-FIG. 7 is held in the adapter of FIG. 6.

DESCRIPTION OF EMBODIMENTS

Description of Embodiment of Present Disclosure

Figure 1:
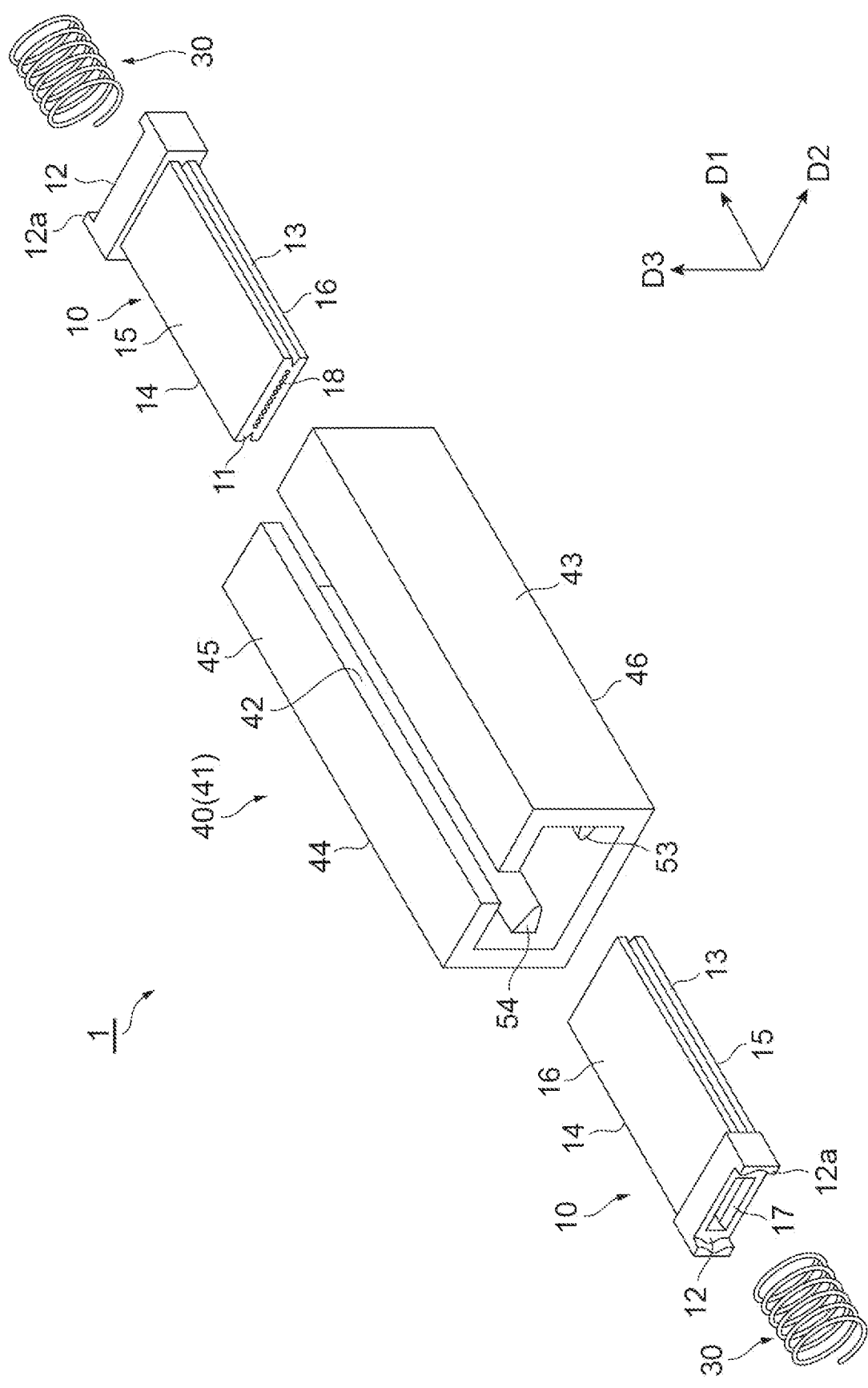
FIG. 1 is an exploded perspective view illustrating an optical connection structure according to one example.

Initially, the contents of an embodiment of the present disclosure will be listed and described. An adapter according to one embodiment of the present disclosure holds a pair of ferrules facing each other. The adapter includes a tubular body having a tubular shape and surrounding the pair of ferrules over half a circumference or more with a line along a first direction as an axis. The tubular body includes a guide extending in the first direction and engaging with side surfaces of the ferrule, and a slit formed from one end to the other end in the first direction.

The optical connection structure according to one embodiment of the present disclosure includes the adapter and the pair of ferrules held in a tubular body of the adapter.

The adapter includes the tubular body in which the slit is formed from the one end to the other end, and is elastically deformable. For this reason, for example, when the tubular body is elastically deformed so as to increase the width of the slit, a restoring force can be generated in the tubular body so as to reduce the width of the slit. In the adapter, since the guide engages with the side surfaces of the ferrule in a state where the pair of ferrules are held inside the tubular body, the pair of ferrules are positioned when viewed in the first direction. Therefore, according to the adapter of one embodiment, it is possible to position a plurality of optical fibers with a simple configuration without using guide pins. Incidentally, when the slit is formed in the tubular body, the tubular body does not actually have a tubular shape; however, in this specification, the shape that surrounds the ferrule over half a circumference or more is defined as a tubular shape.

The tubular body may be made of resin. In this configuration, damage to the ferrules can be suppressed.

The guide may include a first guide extending in the first direction and engaging with a side surface of the ferrule, and a second guide extending in the first direction and engaging with the side surface of the ferrule. In this configuration, since the first guide and the second guide each engage with the side surfaces of the ferrules separately in a state where the pair of ferrules are held inside the tubular body, the pair of ferrules can be more accurately positioned when viewed in the first direction.

The first guide and the second guide each may protrude inward from inner peripheral surfaces of the tubular body. In this configuration, groove-shaped engaging portions corresponding to the first guide and the second guide are formed in a first side surface and a second side surface of the ferrule, so that the first guide can engage with the first side surface, and the second guide can engage with the second side surface.

When viewed in the first direction, each of the first guide and the second guide may have an arc shape. In this configuration, when V grooves corresponding to the first guide and the second guide are formed in the first side surface and the second side surface of the ferrule, the ferrule can be suitably held by the first guide and the second guide.

When viewed in the first direction, the tubular body may have a substantially rectangular frame shape, and the first guide and the second guide are respectively provided on a pair of wall bodies forming short sides of a rectangular shape formed by the tubular body when viewed in the first direction. In this configuration, since the distance between the first guide and the second guide can be increased, the wobbling in a rotation direction of the ferrule taking an axial direction as the first direction is suppressed.

Each of the pair of ferrules may include engaging portions that each engage with the first guide and the second guide. The ferrule is positioned when viewed in the first direction by causing the engaging portions of the ferrule to engage with the first guide and the second guide.

Each of the pair of ferrules may include a first side surface and a second side surface facing each other in a second direction intersecting with the first direction. In this case, the engaging portions may be grooves that are each formed in the first side surface and the second side surface and that extend in the first direction. In this case, when viewed in the first direction, the first guide and the second guide each may protrude from the inner peripheral surfaces of the tubular body to be engageable with the grooves.

A cross-sectional shape of the grooves that intersects with the first direction may be a V shape. When viewed in the first direction, when a tip of each of the first guide and the second guide has an arc shape, the ferrule can be suitably held by the first guide and the second guide.

The optical connection structure may further include a pair of springs that bias the pair of ferrules in a direction in which the ferrules face each other. A force with which the first guide and the second guide press the pair of ferrules is smaller than spring loads with which the pair of springs bias the pair of ferrules. In this configuration, the ferrules held in the adapter can be moved in the first direction by the spring loads. Namely, the pair of ferrules facing each other can be pressed against each other.

Details of Embodiment of Present Disclosure

Hereinafter, one embodiment of the present disclosure will be described in detail with reference to the accompanying drawings. In the following description, the same reference signs are used for the same components or components having the same function, and duplicate descriptions will be omitted.

Figure 2:
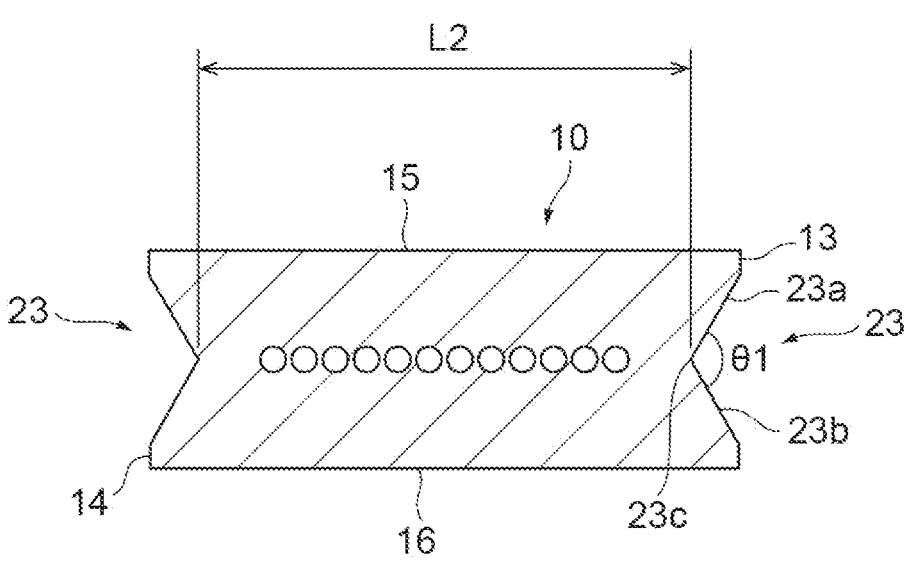
FIG. 2 is a view illustrating a cross-sectional shape of a ferrule according to one example.
Figure 2:
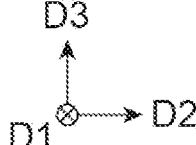
Figure 3:
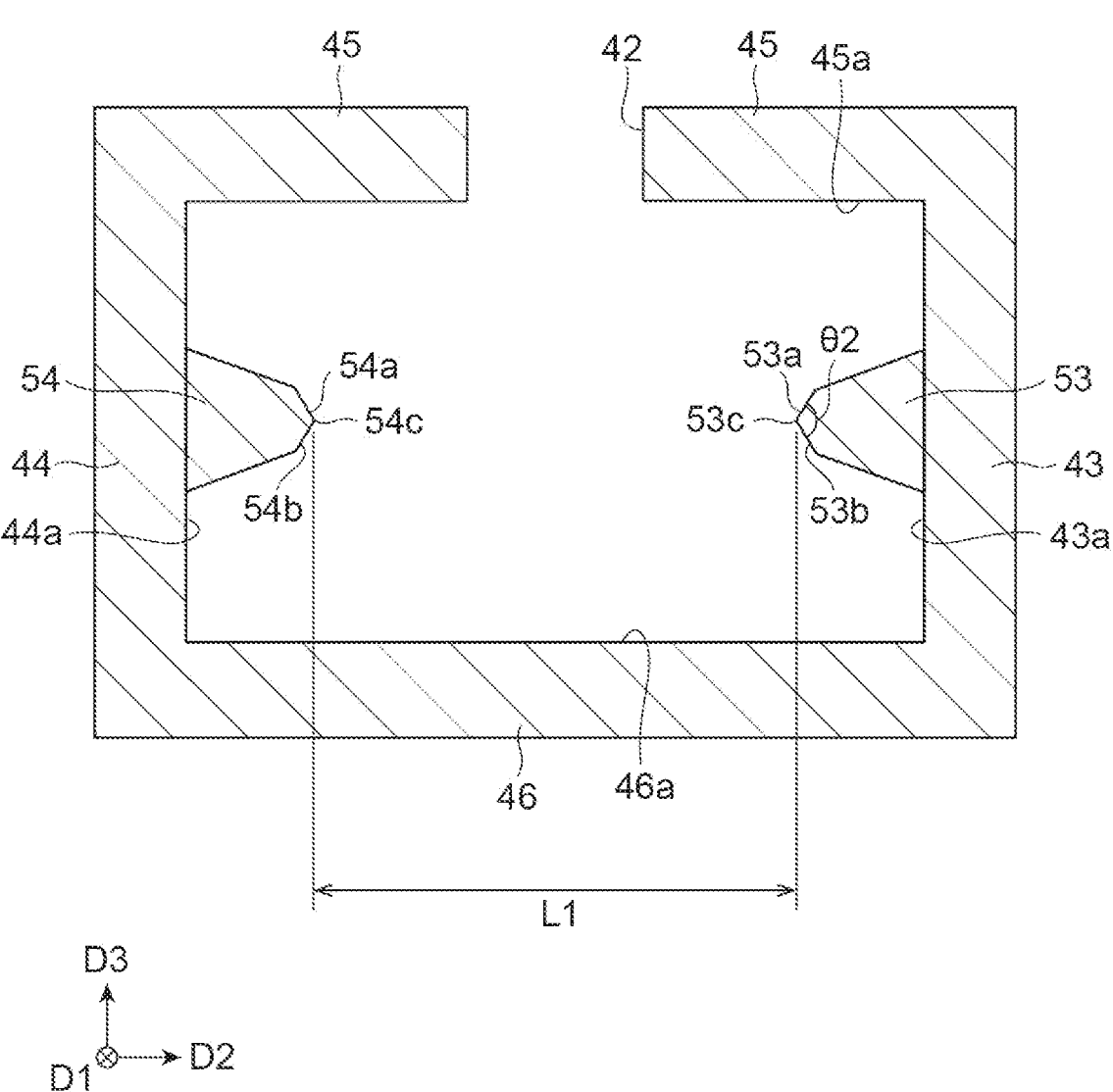
FIG. 3 is a view illustrating a cross-sectional shape of an adapter according to one example.
Figure 4:
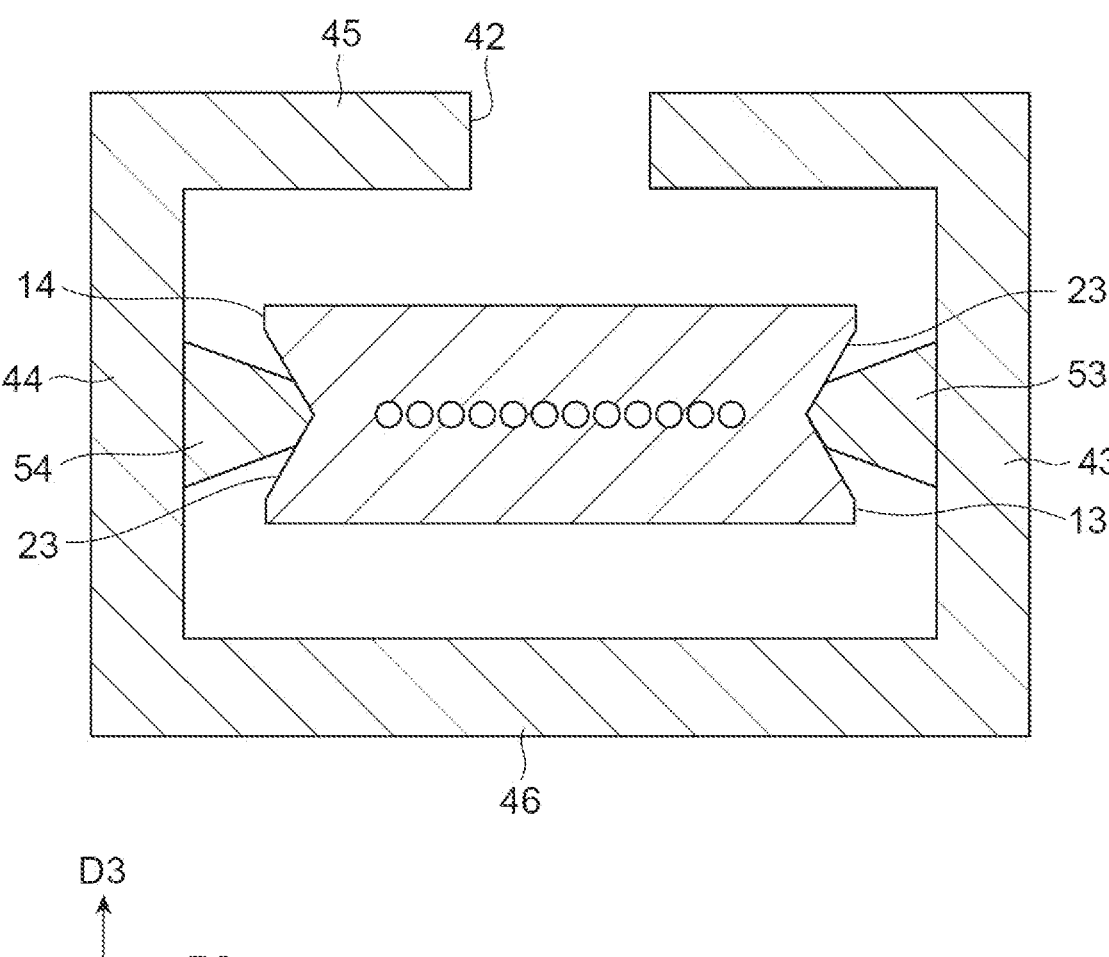
FIG. 4 is a view schematically illustrating the ferrule held in the adapter.

FIG. 1 is an exploded perspective view illustrating an optical connection structure according to one example. FIG. 2 is a view illustrating a cross-sectional shape of a ferrule according to one example. FIG. 3 is a view illustrating a cross-sectional shape of an adapter according to one example. FIG. 4 is a view schematically illustrating the ferrule held in the adapter. An optical connection structure 1 according to one example includes a pair of ferrules 10 and an adapter 40 that holds the pair of ferrules 10. The pair of ferrules 10 have the same shape. The ferrule 10 has a substantially rectangular parallelepiped shape, and has an optical end surface 11 provided at one end of a first direction D1; a rear end surface 12 provided at the other end of the first direction D1; and a first side surface 13, a second side surface 14, a third side surface 15, and a fourth side surface 16 extending along the first direction D1. The optical end surface 11 can face the mating ferrule 10 that is optically connected.

The first side surface 13 and the second side surface 14 face each other in a second direction D2 intersecting with the first direction D1. The third side surface 15 and the fourth side surface 16 face each other in a third direction D3 intersecting with both the first direction D1 and the second direction D2. For example, the first direction D1, the second direction D2, and the third direction D3 are orthogonal to each other.

The ferrule 10 has a plurality (12 locations in the illustrated example) of optical fiber holding holes (optical fiber holding portions) 18 for holding a plurality of optical fibers. The optical fiber is inserted and held in each optical fiber holding hole 18. The optical fiber may be, for example, a single-mode fiber including a core and a cladding. The optical fiber holding holes 18 extend along the first direction D1. The optical fiber holding holes 18 are open to the optical end surface 11 of the ferrule 10. The plurality of optical fiber holding holes 18 are disposed side by side along the second direction D2. In addition, the optical fiber holding holes 18 communicate with an opening 17 for inserting an optical fiber tape core wire. The opening 17 is formed on the rear end surface 12.

The ferrule 10 includes engaging portions 23 that each engage with a first guide 53 and a second guide 54 to be described later. The engaging portion 23 is formed such that a cross-sectional shape along the second direction D2 and the third direction D3 at any position in the first direction D1 is uniform. The engaging portion 23 according to one example may be a groove formed in each of the first side surface 13 and the second side surface 14 and extending in the first direction D1. In the illustrated example, the cross-sectional shape of the engaging portions 23 that intersects with the first direction D1 is a V shape. A pair of inclined surfaces 23a and 23b forming the V-shaped groove are open at a constant angle θ1. For example, the angle θ1 is within a range of 30° to 150° and may be approximately 120° as one example. Incidentally, rounding processing may be applied to a bottom portion 23c of the groove. The bottom portion 23c of the groove is a portion that connects the inclined surfaces 23a and the inclined surface 23b.

For example, the ferrule 10 is made of a material such as polyphenylene sulfide (PPS), polyetherimide (PEI), polycarbonate (PC), polymethyl methacrylate (PMMA), or polyethersulfone (PES). For example, the ferrule 10 is inserted into the adapter 40 along the first direction D1 and is fitted into the adapter 40.

In the optical connection structure 1 of the present disclosure, the pair of ferrules 10 are biased by a pair of springs 30. In one example, the springs 30 bias the pair of ferrules 10 in a direction in which the ferrules 10 face each other. A projection 12a for holding an end portion of the spring 30 from an outer periphery is formed on the rear end surface 12 of the ferrule 10. Incidentally, the spring 30 may, for example, press the ferrule 10 along the first direction D1 in a state where the spring 30 is housed in a housing or the like that is relatively positioned with respect to the adapter 40.

The magnitude of a spring load of the spring 30 pressing the ferrule 10 is not particularly limited, but may be, for example, 10 N or less, more preferably 5 N or less.

The adapter 40 holds the pair of ferrules 10 facing each other. The adapter 40 includes a tubular body 41 extending in the first direction D1, and has a slit 42 formed from one end to the other end in the first direction D1. The tubular body 41 may have a substantially tubular shape, and when viewed in one direction, it is good as long as a wall surface is formed over approximately half a circumference or more around an assumed axis as the center. The adapter 40 according to one example surrounds the pair of ferrules 10 over at least half a circumference or more with a line along the first direction D1 as the axis.

In the illustrated example, when viewed in the first direction D1, the tubular body 41 has a substantially rectangular frame shape. Namely, the tubular body 41 includes a first wall body 43, a second wall body 44, a third wall body 45, and a fourth wall body 46. The first wall body 43 and the second wall body 44 form short sides of the rectangular shape when viewed in the first direction D1. The first wall body 43 has a first inner peripheral surface 43a facing the first side surface 13 of the ferrule 10. The second wall body 44 has a second inner peripheral surface 44a facing the second side surface 14. The third wall body 45 has a third inner peripheral surface 45a facing the third side surface 15 of one ferrule 10 and the fourth side surface 16 of the other ferrule 10. The fourth wall body 46 has a fourth inner peripheral surface 46a facing the fourth side surface 16 of the one ferrule 10 and the third side surface 15 of the other ferrule 10.

In the illustrated example, the slit 42 is formed in the third wall body 45 forming the third inner peripheral surface 45a. The slit 42 is provided along the first direction D1. The slit 42 separates the third wall body 45 into one side and the other side in the second direction D2. The slit 42 of the illustrated example is drawn with a predetermined width in the second direction D2; however, for example, the slit 42 may have no width in a no-load state. Namely, in a no-load state, the third wall body on one side in the second direction D2 and the third wall body 45 on the other side may be in contact with each other. In addition, for example, the slit 42 may be formed over the entire area of the third wall body 45 in the second direction D2.

The tubular body 41 includes the first guide 53 that engages with the engaging portion 23 formed on the first side surface 13 of the ferrule 10, and the second guide 54 that engages with the engaging portion 23 formed on the second side surface 14. Each of the first guide 53 and the second guide 54 is formed such that a cross-sectional shape along the second direction D2 and the third direction D3 at any position in the first direction D1 is uniform. In one example, the first guide 53 and the second guide 54 are formed on the first inner peripheral surface 43a and the second inner peripheral surface 44a, respectively. The first guide 53 and the second guide 54 extend in the first direction D1. The first guide 53 and the second guide 54 of the illustrated example both have a projection shape protruding inward from the first inner peripheral surface 43a and the second inner peripheral surface 44a, respectively. The first guide 53 and the second guide 54 face each other.

In addition, the cross-sectional shape of the first guide 53 and the second guide 54 that intersects with the first direction D1 is a substantially V shape. In the first guide 53, a pair of inclined surfaces 53a and 53b forming the substantially V-shaped projection are connected to each other at a constant angle θ2. Similarly, in the second guide 54, a pair of inclined surfaces 54a and 54b forming the substantially V-shaped projection are connected to each other at the constant angle θ2. The angle θ2 may be the same size as the angle θ1 of the engaging portion 23. Incidentally, when viewed in the first direction D1, rounding processing may be applied to the first guide 53 and the second guide 54 such that respective tips 53c and 54c have an arc shape. In that case, a curvature of the rounding processing of the tips 53c and 54c may be the same as a curvature of the rounding processing of the engaging portion 23.

When viewed in the first direction D1, a distance L1 in a no-load state from the tip 53c of the first guide 53 to the tip 54c of the second guide 54 in the tubular body 41 is smaller than a distance L2 from the bottom portion 23c of the engaging portion 23 of the first side surface 13 to the bottom portion 23c of the engaging portion 23 of the second side surface 14 in the ferrule 10. When the ferrule 10 is held in the tubular body 41 of the adapter 40, the tubular body 41 elastically deforms so as to be pushed and expanded in the second direction D2. The first guide 53 and the second guide 54 press the first side surface 13 and the second side surface 14 of the ferrule 10 with a restoring force when the tubular body 41 has elastically deformed. The force with which the first guide 53 and the second guide 54 press the pair of ferrules 10 is smaller than the spring loads with which the pair of springs 30 bias the pair of ferrules 10.

The tubular body 41 is made of an elastically deformable resin. For example, the tubular body 41 is made of a material such as polyetherimide (PEI), polybutylene terephthalate (PBT), polyphenylene sulfide (PPS), polycarbonate (PC), polymethyl methacrylate (PMMA), polyethersulfone (PES), or polyamide (PA).

As described above, the adapter 40 according to one embodiment of the present disclosure holds the pair of ferrules 10 that face each other and that are optically connected to each other. Each of the pair of ferrules 10 includes the plurality of optical fiber holding holes 18 for holding the plurality of optical fibers, and the first side surface 13 and the second side surface 14 facing each other along the second direction D2 intersecting with the first direction D1 in which the plurality of optical fiber holding holes 18 extend. The adapter 40 includes the tubular body 41 that is elastically deformable. The tubular body 41 surrounds the pair of ferrules 10 over half a circumference or more with a line along the first direction D1 as the axis. The tubular body 41 includes the first guide 53 extending in the first direction D1 and engaging with the first side surface 13; the second guide 54 extending in the first direction D1 and engaging with the second side surface 14; and the slit 42 formed from the one end to the other end in the first direction D1, and presses the first side surface 13 and the second side surface 14 via the first guide 53 and the second guide 54 with the restoring force of elastic deformation.

The adapter 40 includes the tubular body 41 in which the slit 42 is formed from the one end to the other end, and is elastically deformable. For this reason, for example, when the tubular body 41 has elastically deformed so as to increase the width of the slit 42, a restoring force is generated in the tubular body 41 so as to reduce the width of the slit 42. When the adapter 40 holds the ferrule 10, the ferrule 10 is inserted from an end portion in the first direction D1 of the adapter 40. In the adapter 40, in a state where the pair of ferrules 10 are held inside the tubular body 41, the first guide 53 and the second guide 54 press the first side surface 13 and the second side surface 14 with the restoring force of elastic deformation of the tubular body 41. Each of the pair of ferrules 10 may include the engaging portions 23 that each engage with the first guide 53 and the second guide 54. In this case, since the first guide 53 engages with the first side surface 13 and the second guide 54 engages with the second side surface 14, the pair of ferrules 10 are positioned when viewed in the first direction D1. As described above, according to the adapter of one embodiment, it is possible to position the plurality of optical fibers with a simple configuration without using guide pins.

The first guide 53 and the second guide 54 each may protrude inward from the inner peripheral surfaces of the tubular body 41. In addition, the engaging portions 23 may be grooves that are each formed in the first side surface 13 and the second side surface 14 and that extend in the first direction D1. In this configuration, the first guide 53 can engage with the engaging portion 23 of the first side surface 13, and the second guide 54 can engage with the engaging portion 23 of the second side surface 14.

When viewed in the first direction D1, the tubular body 41 has a substantially rectangular frame shape, and the first guide 53 and the second guide 54 may be provided on the first wall body 43 and the second wall body 44, respectively, which form the short sides of the rectangular shape of the tubular body 41 when viewed in the first direction D1. In this configuration, since the distance between the first guide 53 and the second guide 54 can be increased, the wobbling in a rotation direction of the ferrule 10 taking an axial direction as the first direction D1 is suppressed.

The tubular body 41 may be made of resin. In this configuration, damage to the engaging portions 23 of the ferrule 10 by the first guide 53 and the second guide 54 is suppressed.

The optical connection structure 1 may include the pair of springs that bias the pair of ferrules 10 in the direction in which the ferrules face each other. The force with which the first guide 53 and the second guide 54 press the pair of ferrules 10 may be smaller than the spring loads with which the pair of springs 30 bias the pair of ferrules 10. In this configuration, the pair of ferrules 10 held in the adapter 40 can be pressed by the spring loads.

Incidentally, even when the tubular body 41 does not include the third wall body 45, namely, even when the entire area of the third wall body serves as the slit 42, a pair of the engaging portions 23 of the ferrule can be pressed by the first guide 53 and the second guide 54.

However, as in the above-described example, when the third wall body is formed, it becomes difficult that the ferrule 10 held in the adapter is exposed to the outside of the adapter 40. Namely, the ferrule 10 can be protected from the outside by the adapter 40.

The present disclosure is not limited to the embodiment described above, and can be appropriately modified without departing the concept described in the appended claims.

Figure 5:
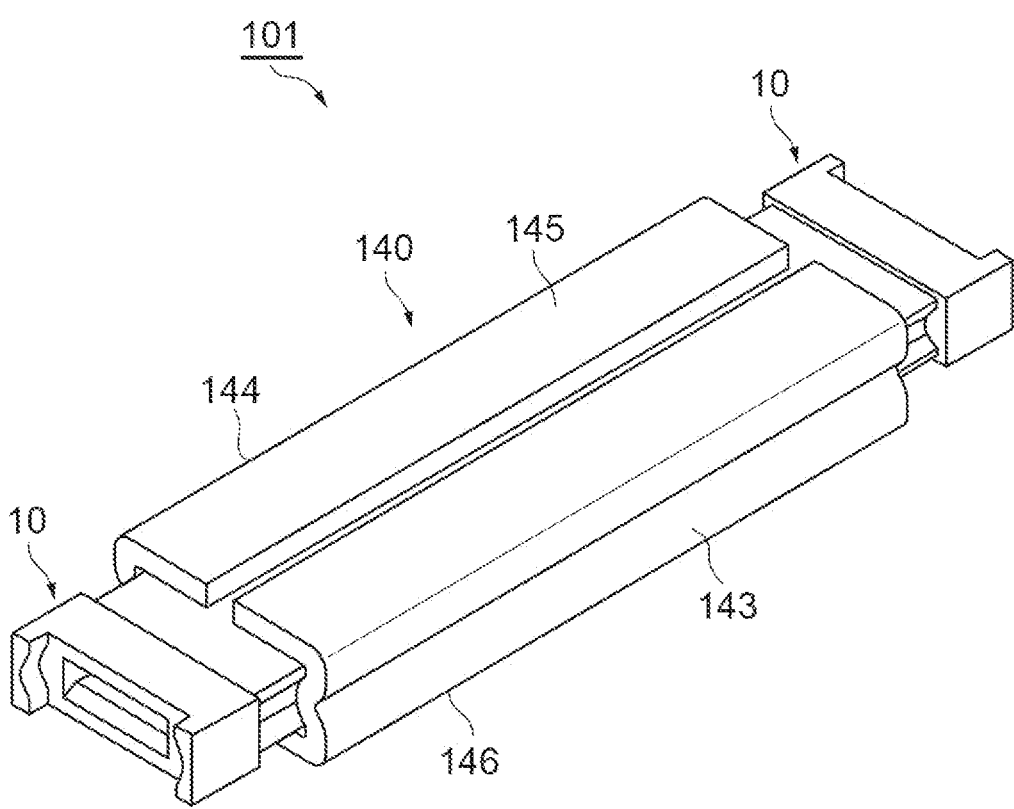
FIG. 5 is a perspective view illustrating an optical connection structure according to another example.
Figure 5:
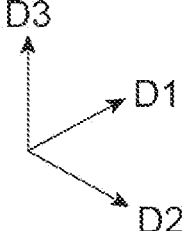
Figure 6:
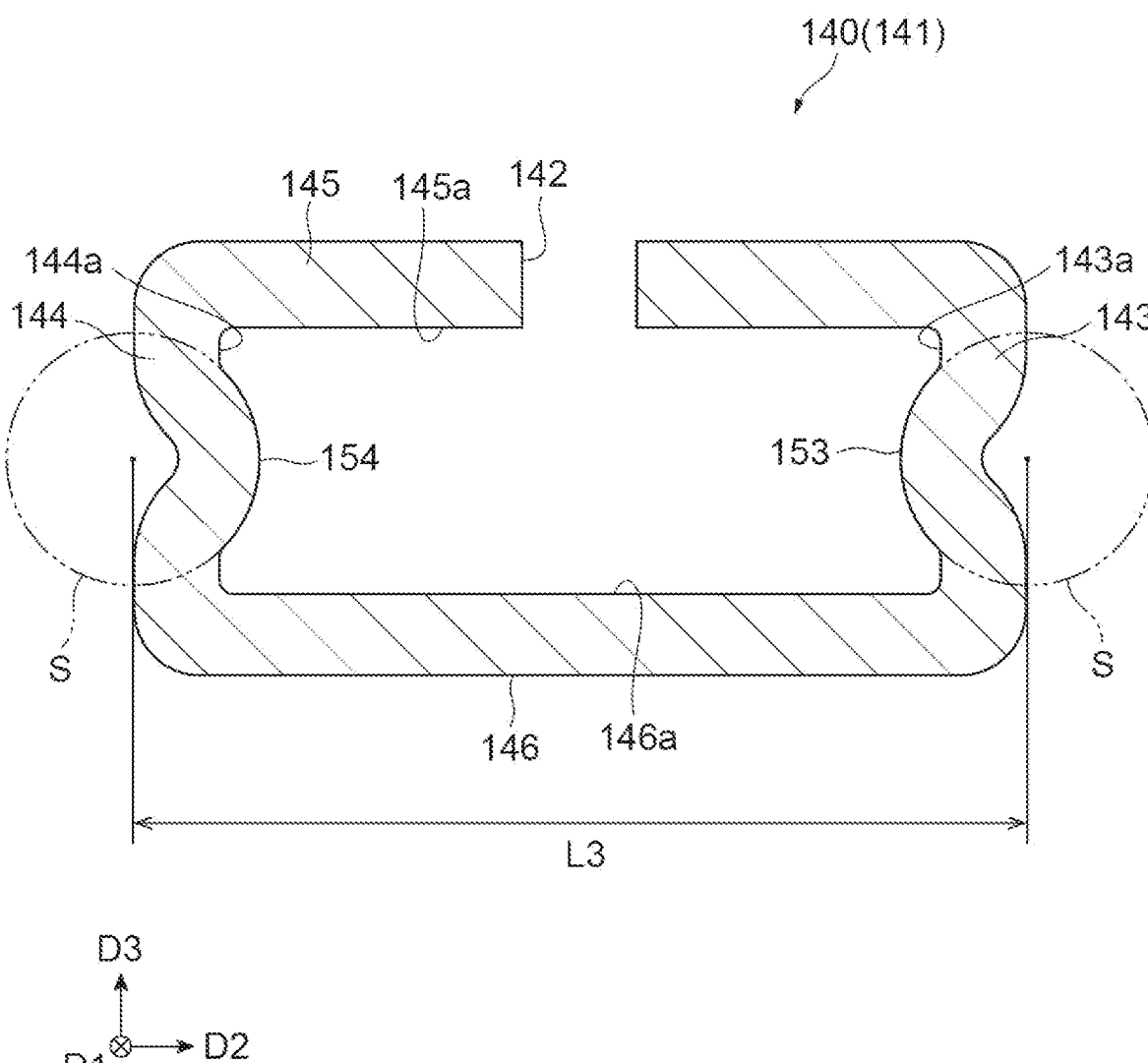
FIG. 6 is a view illustrating a cross-sectional shape of an adapter according to another example.
Figure 7:
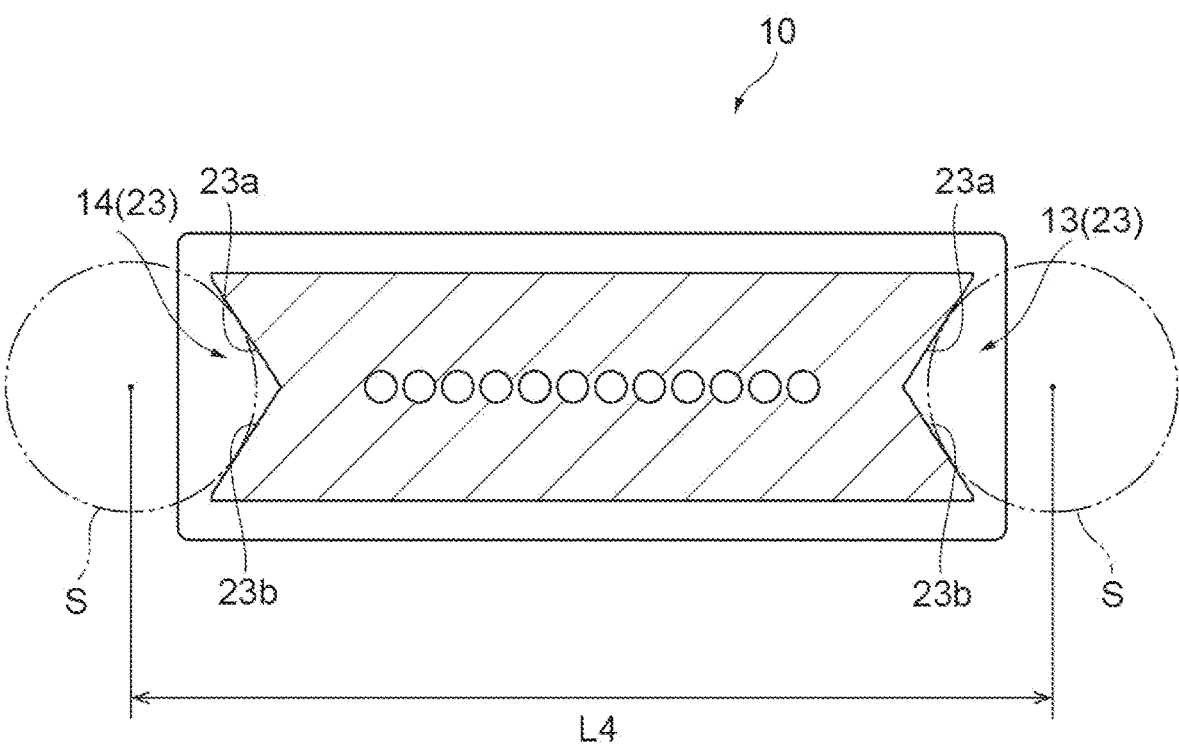
FIG. 7 is a view illustrating a cross-sectional shape of a ferrule according to another example.
Figure 7:
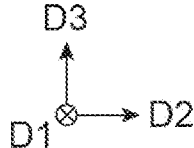
Figure 8:
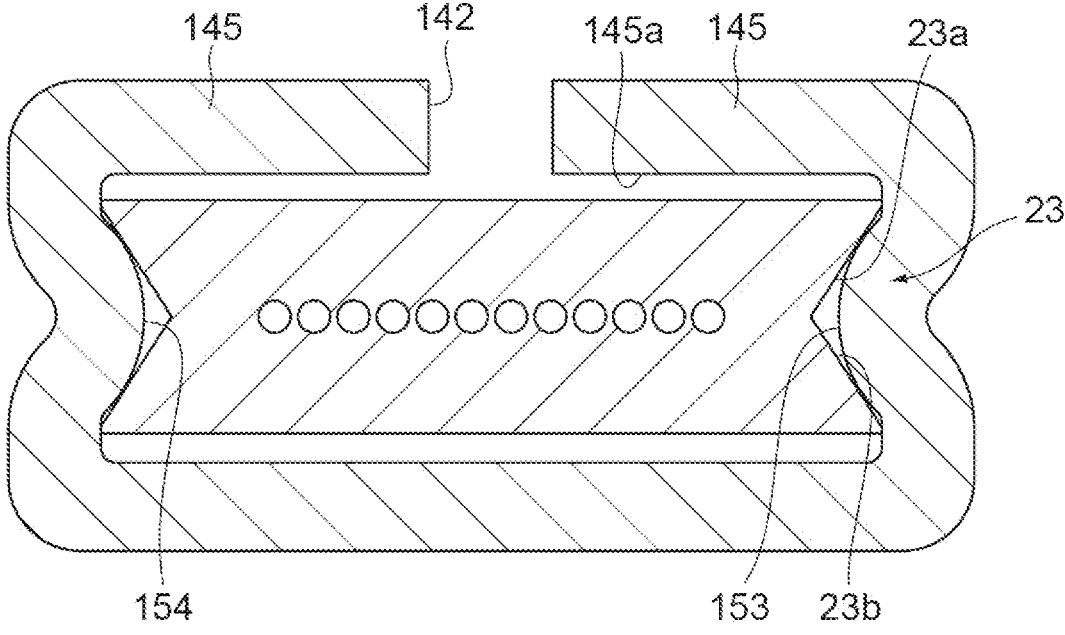
FIG. 8 is a view schematically illustrating a state where the ferrule of FIG. 6
Figure 8:
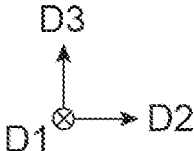

Hereinafter, an optical connection structure including an adapter according to another example will be described. FIG. 5 is a perspective view illustrating the optical connection structure according to another example. FIG. 6 is a view illustrating a cross-sectional shape of an adapter according to another example. FIG. 7 is a view illustrating a cross-sectional shape of a ferrule according to another example. FIG. 8 is a view schematically illustrating a state where the ferrule of FIG. 7 is held in the adapter of FIG. 6.

An optical connection structure 101 includes the pair of ferrules 10 and an adapter 140 that hold the pair of ferrules 10. Although not illustrated in FIG. 5, even in the optical connection structure 101, the pair of ferrules 10 may be biased by the pair of springs 30.

The adapter 140 holds the pair of ferrules 10 facing each other. The adapter 140 includes a tubular body 141 extending in the first direction D1, and has a slit 142 formed from one end to the other end in the first direction D1. In the illustrated example, when viewed in the first direction D1, the tubular body 141 has a substantially rectangular frame shape. Namely, the adapter 140 includes a first wall body 143, a second wall body 144, a third wall body 145, and a fourth wall body 146. The first wall body 143 and the second wall body 144 form short sides of the rectangular shape when viewed in the first direction D1. The first wall body 143 has a first inner peripheral surface 143a facing the first side surface 13 of the ferrule 10. The second wall body 144 has a second inner peripheral surface 144a facing the second side surface 14. The third wall body 145 has a third inner peripheral surface 145a facing the third side surface 15. The fourth wall body 146 has a fourth inner peripheral surface 146a facing the fourth side surface 16. In the illustrated example, the slit 142 is formed in the third wall body 145 forming the third inner peripheral surface 145a.

The tubular body 141 includes a first guide 153 that engages with the first side surface 13 of the ferrule 10, and a second guide 154 that engages with the second side surface 14. Each of the first guide 153 and the second guide 154 is formed such that a cross-sectional shape along the second direction D2 and the third direction D3 at any position in the first direction D1 is uniform. In one example, the first guide 153 and the second guide 154 are formed on the first inner peripheral surface 143a and the second inner peripheral surface 144a by curving the first wall body 143 and the second wall body 144 inward, respectively. The first guide 153 and the second guide 154 extend in the first direction D1.

When viewed in the first direction D1, the first guide 153 and the second guide 154 of the illustrated example both have an arc shape protruding inward from the first inner peripheral surface 143a and the second inner peripheral surface 144a, respectively. The first guide 153 and the second guide 154 face each other. In this example, curvatures of the first guide 153 and the second guide 154 each having an arc shape are equal to each other. Namely, an imaginary circle S tangent to an arc-shaped portion of the first inner peripheral surface 143a and an imaginary circle S tangent to an arc-shaped portion of the second inner peripheral surface 144a have the same diameter. As one example, the radius of the imaginary circle S may be approximately 0.2 mm to 2.0 mm.

In a no-load state, a distance L3 (refer to FIG. 6) between the center of the imaginary circle S tangent to the arc-shaped portion of the first inner peripheral surface 143a and the center of the imaginary circle S tangent to the arc-shaped portion of the second inner peripheral surface 144a is smaller than a distance L4 (refer to FIG. 7) between the center of an imaginary circle S tangent to the engaging portion 23 of the first side surface 13 of the ferrule 10 and the center of an imaginary circle S tangent to the engaging portion 23 of the second side surface 14. Incidentally, the diameter of the imaginary circles S tangent to the first side surface 13 and the second side surface 14 are the same as the diameter of the imaginary circles S tangent to the first inner peripheral surface 143a and the second inner peripheral surface 144a. When the ferrule 10 is held in the tubular body 141 of the adapter 140, the tubular body 141 elastically deforms so as to be pushed and expanded in the second direction D2. The first guide 153 and the second guide 154 press the first side surface 13 and the second side surface 14 of the ferrule 10 with a restoring force when the tubular body 141 has elastically deformed. The force with which the first guide 153 and the second guide 154 press the pair of ferrules 10 is smaller than the spring loads with which the pair of springs bias the pair of ferrules 10.

The tubular body 141 is made of an elastically deformable resin. For example, the tubular body 141 is made of a material such as polyetherimide (PEI), polybutylene terephthalate (PBT), polyphenylene sulfide (PPS), polycarbonate (PC), polymethyl methacrylate (PMMA), polyethersulfone (PES), or polyamide (PA).

According to the adapter 140 of another embodiment, similarly to the adapter 40 according to the example of FIG. 1 and the like, it is possible to position the plurality of optical fibers with a simple configuration without using guide pins.

In addition, when viewed in the first direction D1, each of the first guide 153 and the second guide 154 has an arc shape. The cross-sectional shape of the engaging portions 23 that intersects with the first direction D1 is a V shape. In this configuration, a deviation of the angle of tips of the first guide 153 and the second guide 154 can be allowed. The first guide 153 and the second guide 154 are in line contact with the left and right inclined surfaces 23a and 23b, respectively, which form the V-shaped engaging portion 23 of the ferrule 10, so that the ferrule 10 is positioned. When the tubular body 141 is pushed and expanded, the tip of the first guide 153 and the tip of the second guide 154 deviate from an angle at which the tips face each other, to face slightly toward the third inner peripheral surface 145a from a position where the tips face each other. However, since the first guide 153 and the second guide 154 have an arc shape when viewed in the first direction D1, even when the angle of the tips deviates, the first guide 153 and the second guide 154 can be in line contact with the engaging portions 23 of the ferrule 10 in the same manner as when there is no deviation.

In addition, the shape of the engaging portions 23 provided in the ferrule 10 and the shape of the first guide 153 and the second guide 154 provided in the adapter 140 are not limited to the shapes of the above-described example. FIGS. 9 to 13 are schematic views for describing further other optical connection structures. FIGS. 9 to 13 schematically illustrate modification examples of how engaging portions of a ferrule engage with guides (a first guide and a second guide) of an adapter when viewed in the first direction D1. Incidentally, in these drawing, only main parts are drawn and for example, the third wall body and the fourth wall body of the adapter are not drawn.

Figure 9:
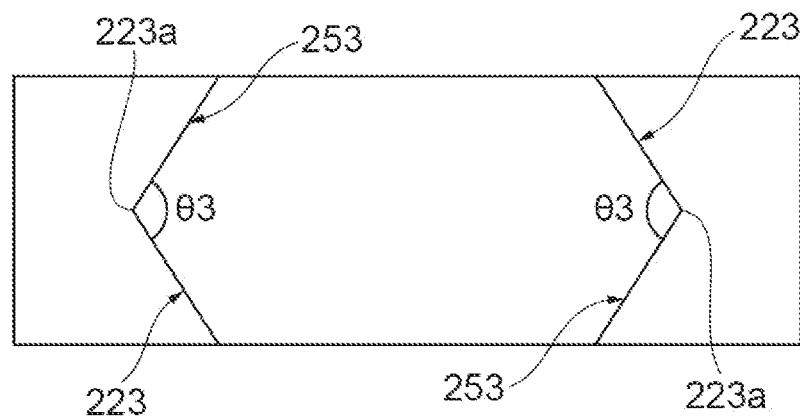
FIG. 9 is a schematic view for describing further another optical connection structure.
Figure 9:
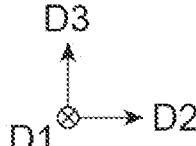

As illustrated in FIG. 9, an engaging portion 223 of the ferrule may protrude outward in the second direction D2, and a guide 253 of the adapter may be formed in a groove shape so as to correspond to the engaging portion 223. In the illustrated example, the cross-sectional shape of the engaging portion 223 of the ferrule taken in a direction intersecting with the first direction D1 is a V shape. When viewed in the first direction D1, a vertex 223a of the engaging portion 223 having a V shape protrudes outward in the second direction D2. In addition, the cross-sectional shape of the guide 253 of the adapter taken in the direction intersecting with the first direction D1 is a V shape that is open at an angle of the same size as an angle θ3 of the vertex 223a of the engaging portion 223.

Figure 10:
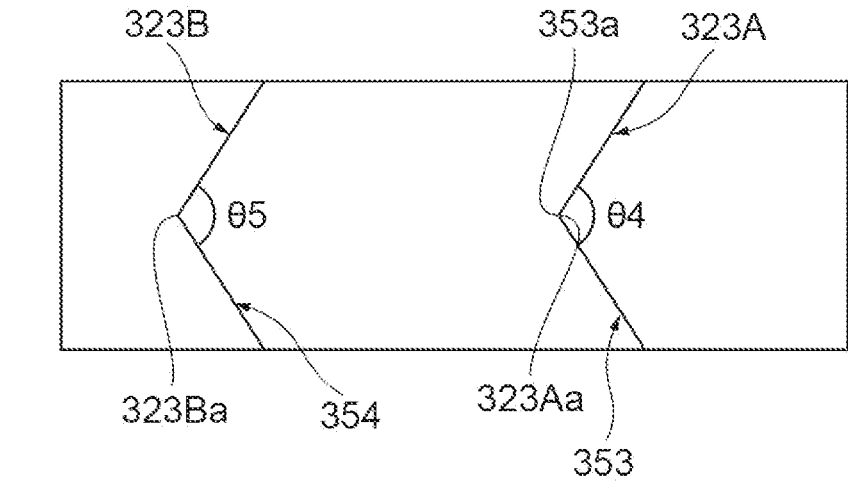
FIG. 10 is a schematic view for describing further another optical connection structure.

As illustrated in FIG. 10, the shapes of a pair of engaging portions may be different from each other, and the shapes of a pair of guides may be different from each other. In the illustrated example, the cross-sectional shape of one engaging portion 323A of the ferrule taken in a direction intersecting with the first direction D1 is a V shape. When viewed in the first direction D1, a bottom portion 323Aa of the engaging portion 323A having a V shape is recessed inward in the second direction D2. In addition, the cross-sectional shape of the other engaging portion 323B of the ferrule taken in the direction intersecting with the first direction D1 is a V shape. When viewed in the first direction D1, a vertex 323Ba of the engaging portion 323B having a V shape protrudes outward in the second direction D2. In addition, the cross-sectional shape of one guide 353 of the adapter taken in the direction intersecting with the first direction D1 is a V shape with a vertex 353a having an angle being the same size as an angle θ4 of the bottom portion 323Aa of the engaging portion 323A. In addition, the cross-sectional shape of the other guide 354 of the adapter taken in the direction intersecting with the first direction D1 is a V shape that is open at an angle of the same size as an angle θ5 of the vertex 323Ba of the engaging portion 323B.

Figure 11:
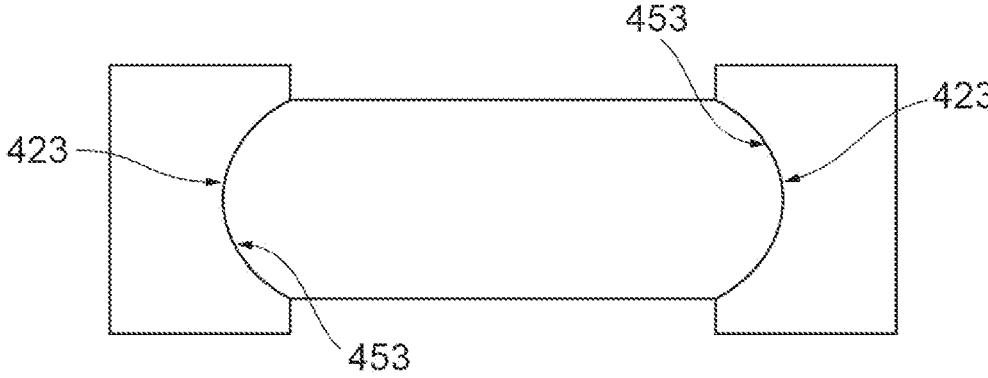
FIG. 11 is a schematic view for describing further another optical connection structure.
Figure 11:
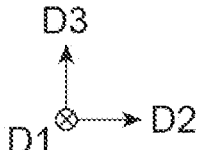

As illustrated in FIG. 11, an engaging portion 423 of the ferrule may protrude outward in the second direction D2, and a guide of the adapter may be formed in a groove shape so as to correspond to the engaging portion. In the illustrated example, the cross-sectional shape of the engaging portion 423 of the ferrule taken in a direction intersecting with the first direction D1 is a U shape that is curved at a predetermined curvature. When viewed in the first direction D1, the engaging portion 423 protrudes outward in the second direction D2. In addition, the cross-sectional shape of a guide 453 of the adapter taken in the direction intersecting with the first direction is a U shape that is curved at the same curvature as the curvature of the engaging portion 423.

Figure 12:
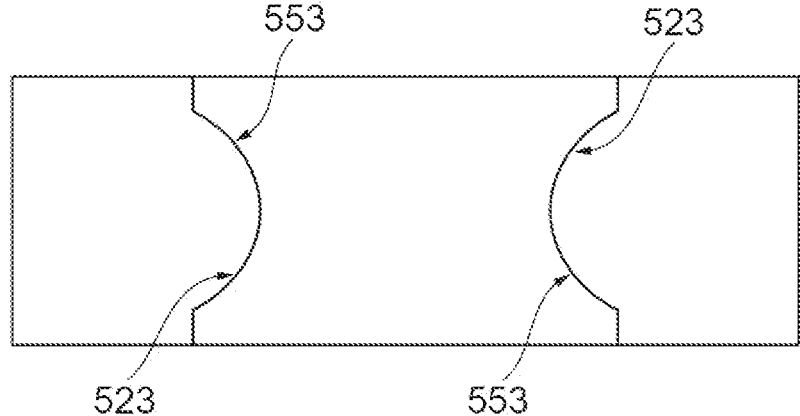
FIG. 12 is a schematic view for describing further another optical connection structure.
Figure 12:
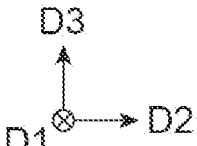

As illustrated in FIG. 12, an engaging portion 523 of the ferrule may be formed in a groove shape, and a guide of the adapter may protrude inward in the second direction to correspond to the engaging portion. In the illustrated example, the cross-sectional shape of the engaging portion 523 of the ferrule taken in the direction intersecting with the first direction D1 is a U shape that is curved at a predetermined curvature. In addition, the cross-sectional shape of a guide 553 of the adapter taken in the direction intersecting with the first direction is a U shape that is curved at the same curvature as the curvature of the engaging portion.

Figure 13:
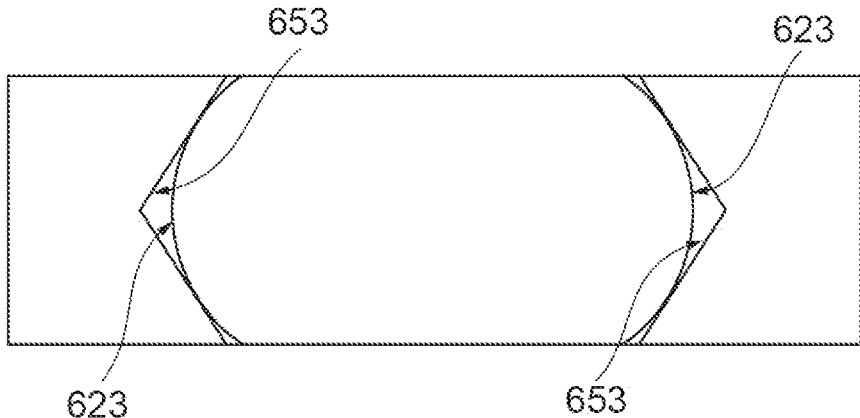
FIG. 13 is a schematic view for describing further another optical connection structure.
Figure 13:

As illustrated in FIG. 13, an engaging portion of the ferrule may protrude outward in the second direction D2, and a guide of the adapter may be formed in a groove shape so as to correspond to the engaging portion. In the illustrated example, the cross-sectional shape of an engaging portion 623 of the ferrule taken in a direction intersecting with the first direction D1 is a U shape that is curved at a predetermined curvature. When viewed in the first direction D1, the engaging portion 623 protrudes outward in the second direction D2. In addition, the cross-sectional shape of a guide 653 of the adapter taken in the direction intersecting with the first direction D1 is a V shape that is open at a predetermined angle.

In addition, in the above-described modes, as long as there is no contradiction or problem, configurations in one mode can be used or added to other modes.

In addition, the adapter may not be entirely made of an elastic material, and may be elastically deformable by having a part of the adapter made of an elastic material.

REFERENCE SIGNS LIST

1: optical connection structure, 10: ferrule, 11: optical end surface, 12: rear end surface, 12a: projection, 13: first side surface, 14: second side surface, 15: third side surface, 16: fourth side surface, 17: opening, 18: optical fiber holding hole (optical fiber holding portion), 23: engaging portion, 23*a*: inclined surface, 23*b*: inclined surface, 23*c*: bottom portion, 30: spring, 40: adapter, 41: tubular body, 42: slit, 43: first wall body, 43*a*: first inner peripheral surface, 44: second wall body, 44*a*: second inner peripheral surface, 45: third wall body, 45*a*: third inner peripheral surface, 46: fourth wall body, 46*a*: fourth inner peripheral surface, 53: first guide, 53*a*: inclined surface, 53*b*: inclined surface, 53*c*: tip, 54: second guide, 54*a*: inclined surface, 54*b*: inclined surface, 54*c*: tip, 101: optical connection structure, 140: adapter, 141: tubular body, 142: slit, 143: first wall body, 143*a*: first inner peripheral surface, 144: second wall body, 144*a*: second inner peripheral surface, 145: third wall body, 145*a*: third inner peripheral surface, 146: fourth wall body, 146*a*: fourth inner peripheral surface, 153: first guide, 154: second guide, 223: engaging portion, 223*a*: vertex, 253: guide, 323A: engaging portion, 323Aa: bottom portion, 323B: engaging portion, 323Ba: vertex, 353: guide, 353*a*: vertex, 354: guide, 423: engaging portion, 453: guide, 523: engaging portion, 553: guide, 623: engaging portion, 653: guide, D1: first direction, D2: second direction, D3: third direction, L1 to L4: distance, S: imaginary circle, 01 to 05: angle.

The invention claimed is:

1. An optical connection structure comprising:
an adapter that holds a pair of ferrules facing each other, the adapter comprising:
a tubular body having a substantially rectangular tubular shape and surrounding the pair of ferrules such that the tubular body surrounds half or more of an outer peripheral length of each of the ferrules having a longitudinal axis along a first direction,
wherein the tubular body includes:
a first inner peripheral surface,
a second inner peripheral surface that is parallel to the first inner peripheral surface and faces the first inner peripheral surface along a second direction that is orthogonal to the first direction,
a third inner peripheral surface that is orthogonal to the first inner peripheral surface and to the second inner peripheral surface,
a fourth inner peripheral surface that is parallel to the third inner peripheral surface that faces the third inner peripheral surface along a third direction orthogonal to the first direction and the second direction,
a first guide that protrudes from the first inner peripheral surface toward the second inner peripheral surface, and
a second guide that protrudes from the second inner peripheral surface toward the first inner peripheral surface,
wherein a top surface of the tubular body and the third inner peripheral surface define an upper wall of the tubular body, and
wherein a slit is formed in the upper wall and extends in the first direction from a first end to a second end opposite the first end of the tubular body; and
the pair of ferrules held in the tubular body of the adapter, wherein;
each of the pair of ferrules has a first engaging portion on a first side surface and a second engaging portion on a second side surface opposing the first side surface,
the first engaging portion of each of the pair of ferrules engages with the first guide, the second engaging portion of each of the pair of ferrules engages with the second guide, and
the pair of ferrules are biased in a direction in which the ferrules face each other via a pair of springs respectively disposed on a rear end side of each of the ferrules.

2. The optical connection structure according to claim 1, wherein the tubular body of the adapter is made of resin.

3. The optical connection structure according to claim 1, wherein the first guide and the second guide each protrude inward from the respective first and second inner peripheral surfaces of the tubular body, such that the first guide and the second guide protrude directly toward each other along the second direction orthogonal to the first direction and to the third direction.

4. The optical connection structure according to claim 1, wherein when viewed in the first direction, each of the first guide and the second guide has an arc shape.

5. The optical connection structure according to claim 1, wherein when viewed in the first direction, the tubular body has a substantially rectangular frame shape, and
the first and second inner peripheral surfaces are a pair of wall bodies forming short sides of the rectangular frame shape formed by the tubular body when viewed in the first direction.

6. The optical connection structure according to claim 1, the first and second engaging portions are grooves that are respectively formed in the first side surface and the second side surface of each of the pair of ferrules, and
the first and second engaging portions extend in the first direction.

7. The optical connection structure according to claim 6, wherein a cross-sectional shape of the grooves that intersects with the first direction is a V shape.

8. The optical connection structure according to claim 1, wherein a force with which the first guide and the second guide press the pair of ferrules is smaller than spring loads with which the pair of springs bias the pair of ferrules.

9. The optical connection structure according to claim 1, wherein
each of the pair of ferrules has a rear end surface that is opposite a front end surface facing each other,
the rear end surface of each of the pair of ferrules has a pair of projections that project in the first direction or a direction opposite the first direction,
the pair of projections are provided on both ends of the rear end surface in the second direction orthogonal to the first direction.

10. The optical connection structure according to claim 9, wherein
the pair of springs that bias the pair of ferrules in the direction in which the ferrules face each other, are disposed between the pair of projections.

11. The optical connection structure according to claim 1, wherein
when viewed in the first direction, in a no-load state, a shortest distance from a tip of the first guide to a tip of the second guide along the second direction is smaller than a shortest distance between the first and second engaging portions on each of the pair of ferrules, and
when viewed in the first direction, in a load state where the pair of ferrules are held inside the tubular body, the tubular body elastically deforms to be expanded in the third direction orthogonal to the first direction and the second direction such that the slit in the upper wall is widened.

\* \* \* \* \*